United States Patent
Haynes et al.

(10) Patent No.: US 6,574,753 B1
(45) Date of Patent: Jun. 3, 2003

(54) PEER LINK FAULT ISOLATION

(75) Inventors: Michael D. Haynes, Raleigh, NC (US); Charles H. Hopkins, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/479,488

(22) Filed: Jan. 10, 2000

(51) Int. Cl.⁷ .............................. G06F 11/00
(52) U.S. Cl. .................. 714/43; 714/4; 714/9; 714/11; 714/13
(58) Field of Search .............. 714/9, 4, 11, 13, 714/43

(56) References Cited

U.S. PATENT DOCUMENTS

| | | | |
|---|---|---|---|
| 5,144,692 A | 9/1992 | Baker et al. ............... 395/425 |
| 5,588,111 A | * 12/1996 | Cutts et al. .................. 714/9 |
| 5,701,502 A | 12/1997 | Baker et al. ............... 395/800 |
| 5,710,777 A | * 1/1998 | Gawne ....................... 714/43 |
| 5,720,028 A | * 2/1998 | Matsumoto et al. .......... 714/9 |
| 5,777,874 A | * 7/1998 | Flood et al. ................. 714/11 |
| 5,901,281 A | 5/1999 | Miyao et al. ........... 395/182.09 |
| 5,922,077 A | 7/1999 | Espy et al. ................... 714/7 |
| 5,928,367 A | * 7/1999 | Nelson et al. ................ 714/6 |
| 6,009,481 A | * 12/1999 | Mayer ......................... 710/3 |

* cited by examiner

Primary Examiner—Robert Beausoliel
Assistant Examiner—Michael Maskulinski
(74) Attorney, Agent, or Firm—Bromberg & Sunstein LLP

(57) ABSTRACT

Default isolation method assists in correction of a fault in a peer-to-peer communication link between two storage processors. Each processor is associated with a fault indicator which is activated according to the method to guide a technician in replacing the storage processors one at a time to determine the fault with the peer-to-peer communication link. Upon detection of a fault, one of the processors is suspended so that a technician may replace it with a new storage processor. The surviving storage processor detects whether a new storage processor has been replaced. If the peer-to-peer communication link still fails, the surviving processor instructs the peer processor to boot up and then suspends itself. Communications outside of the peer-to-peer communication link can take place between the processors by leaving a message in at least one of the disk drives which is periodically checked by the processors.

22 Claims, 4 Drawing Sheets

PEER LINK FAULT ISOLATION

BACKGROUND OF THE INVENTION

The present invention is directed to a method for isolating a fault in a peer-to-peer communication link between two processors.

Numerous computer systems have been assembled with two redundant processors. In particular, data storage systems are known in which a pair of storage processors are connected to an array of disk drives. For example, such a system is disclosed in U.S. Pat. No. 5,922,077 (Espy et al.). The full disclosure of said patent is hereby incorporated by reference herein. Espy et al. describes a dual data storage controller system in which the controllers are connected to one another by a peer-to-peer communication link. Each data storage controller is connected to a fibre channel loop in connection with each of the disk drives in the disk array. Fail-over switches provide each data storage controller with a means for connecting to either one of the fibre channel loops.

The peer-to-peer link between processors is typically used for configuration management. Prior systems lacking a dedicated peer-to-peer communication link may have used back end buses for transportation of configuration management information. If there is a failure in this back end link, the loss of all back end buses is implied in which case the processor will not be able to access the disk drives. As such, there is no benefit in continuing to operate the storage processor and it might as well be shut down. In such a configuration, if the back end is working and the storage processor cannot contact its peer, it is safe to assume that the peer is dead.

In the case where the peer-to-peer communication takes place over a single dedicated configuration management channel between the two processors, if a processor cannot communicate with its peer, it can't be sure if the peer is dead or if the communication channel failed. Therefore, it does not know if certain operations can be safely performed. In order to address this problem, alternative peer-to-peer communication links were developed. In particular, by the use of mailboxes on disk drives, processors may be able to communicate through the disk drives to coordinate a safe completion of operations that require coordination between the two processors. For example, when a write cache is mirrored between the two processors, such operation needs to terminate when communication over the peer-to-peer link is interrupted. Upon termination of the mirroring, a write cache needs to be dumped to complete the write operations. The alternative communication link through the mailboxes on disk drives permits coordination between the processors so that only one of them dumps the cache so that the cache dump can proceed without interference from the other processor. It is only necessary that one of the caches be dumped since they have been mirrored. While termination of the cache mirroring operation is able to be carried out through the mailboxes of the disk drives, there remains the problem of identifying the cause of the failure of the peer-to-peer communication link.

SUMMARY OF THE INVENTION

In accordance with embodiments of the invention, dual processors are programmed to perform a fault isolation method so that the processor causing the fault in the peer-to-peer communication link can be replaced while the other processor remains operational during the fault detection.

An embodiment of the method of the invention involves a number of steps beginning with detecting an inability to communicate over the peer-to-peer communication link. The method suspends a preselected one of the storage processors and suspends its operation arbitrarily indicating a fault with that storage processor. A user replaces the indicated storage processor with a new storage processor. The other storage processor detects replacement of the first storage processor. The new storage processor powers up. Before fully booting up, the storage processors test the peer-to-peer communication link. If the problem with the peer-to-peer communication is solved, operation returns to normal. If after the first storage processor was replaced and the peer-to-peer communication link still fails to provide communication between the two processors, the second storage processor recognizing itself as a survivor, instructs the first storage processor to boot up and then suspends operation.

An embodiment of the program code for powering up a storage processor includes code for attempting to communicate over the peer-to-peer communication link. Code is further included to permit communication with its peer storage processor by leaving messages in at least one of the disk drives. The code knows to suspend the storage processor in a first chassis position when there is a failure to communicate over the peer-to-peer communication link, and both storage processors are running in normal operation mode. Code is also included so that a survivor of a previous peer-to-peer communication link failure detecting replacement of the peer storage processor and an inability to communicate over the peer-to-peer communication link, instructs its peer through leaving a message in at least one of the disk drives to boot up and suspends itself. In the survivor mode, if replacement of the peer storage processor has not been detected and a peer-to-peer communication link failure is alerted, it will instruct its peer through leaving a message in at least one of the disk drives to suspend operation.

In accordance with the data storage system of an embodiment of the invention, a first and second storage processor are connected via a peer-to-peer communication link. A first communication channel connects the first storage processor to a plurality of disk drives. A second communication channel connects the second storage processor to the disk drives. A program code is maintained in each processor for enacting a survivor mode in which the processor can detect replacement of the peer storage processor. Each of the storage processors may be provided with a failure indicator which could be a light, a buzzer, or the like so that a user knows which processor to replace.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
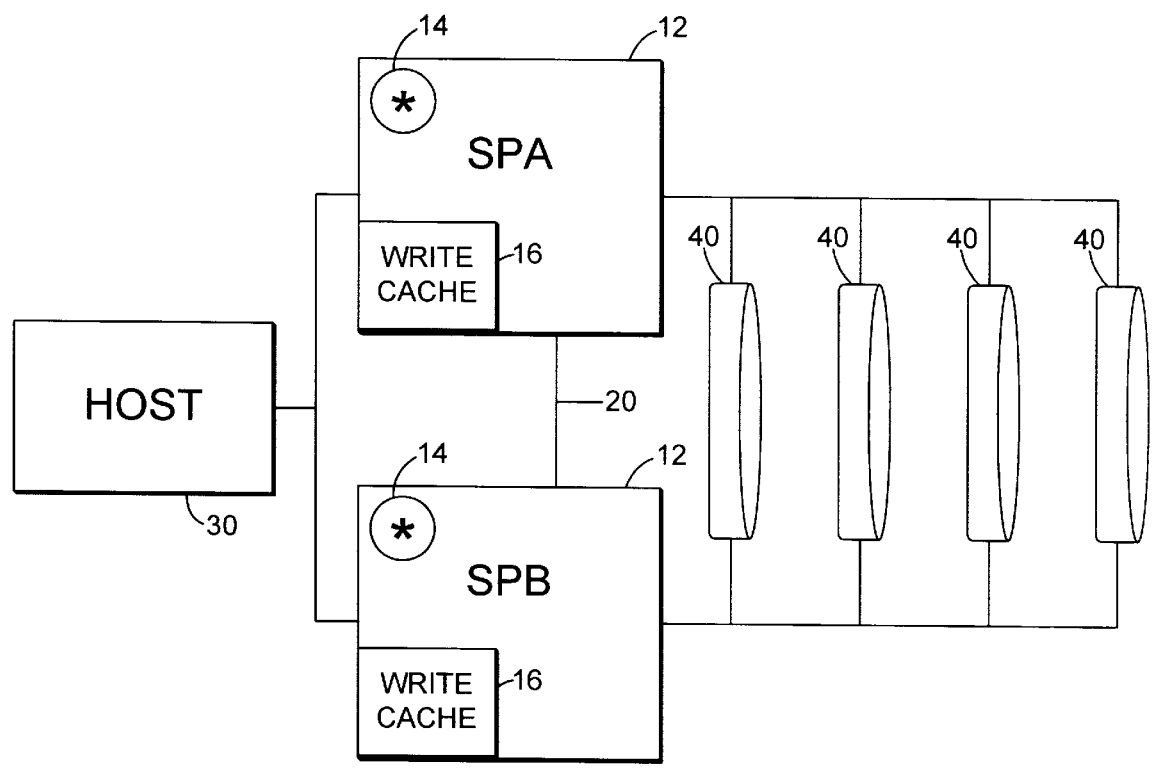
FIG. 1 is a schematic block diagram of a dual processor data storage system of an embodiment of the present invention.

An example of the dual processor data storage system is discussed with respect to FIG. 1. Storage processors 12 are each mounted on its own board. The systems are generally housed within a chassis. Insertion of a processor board into a chassis slot causes the processor to assume the identity associated with that slot. Thus, there would be a processor A slot and a processor B slot (or first processor and second processor) in the chassis for receiving the storage processors 12. Connections with other components of the system are made through a backplane or by making cable connections from one port to another. The system includes a fault indicator 14 associated with each of the storage processors 12. The fault indicator 14 may be a light or a buzzer or other indicator readily detectable by a user or technician servicing the system. The fault indicator 14 may be located on the chassis or on the processor board.

The dual processor system of an embodiment of the invention includes a single dedicated peer-to-peer communication link 20 over the backplane. The processors can use the link to coordinate their activities. In a particular preferred embodiment of the invention, each processor includes a write cache 16. Moreover, the write cache 16 is mirrored between the two processors. Mirroring of the write operations is achieved with the assistance of communications through the peer-to-peer communication link 20. A host computer 30 is connected either directly or through a network with the storage processors 12. The host uses the storage system for reading and writing data to and from a disk array. The data storage system may include any number of disk drives in communication with the storage processors. In a presently preferred embodiment, the disk drives 40 are dual ported so that redundant communication channels may be employed. The communication channel from the storage processor to the disk drives may be a fibre channel loop or other known bus for communicating data. In a presently preferred embodiment, storage processor A communicates over a first fibre channel loop with the disk drives 40 in the array and storage processor B communicates over a second fibre channel loop with the disk drives 40. Failover switches may be inserted between the fibre channel loops and the storage processors so that if one loop should be faulty, the two storage processors could share the other's fibre channel loop. Such a failover switching system is described in U.S. Pat. No. 5,922,077 (Espy et al.) which has been incorporated by reference herein.

Figure 2A:
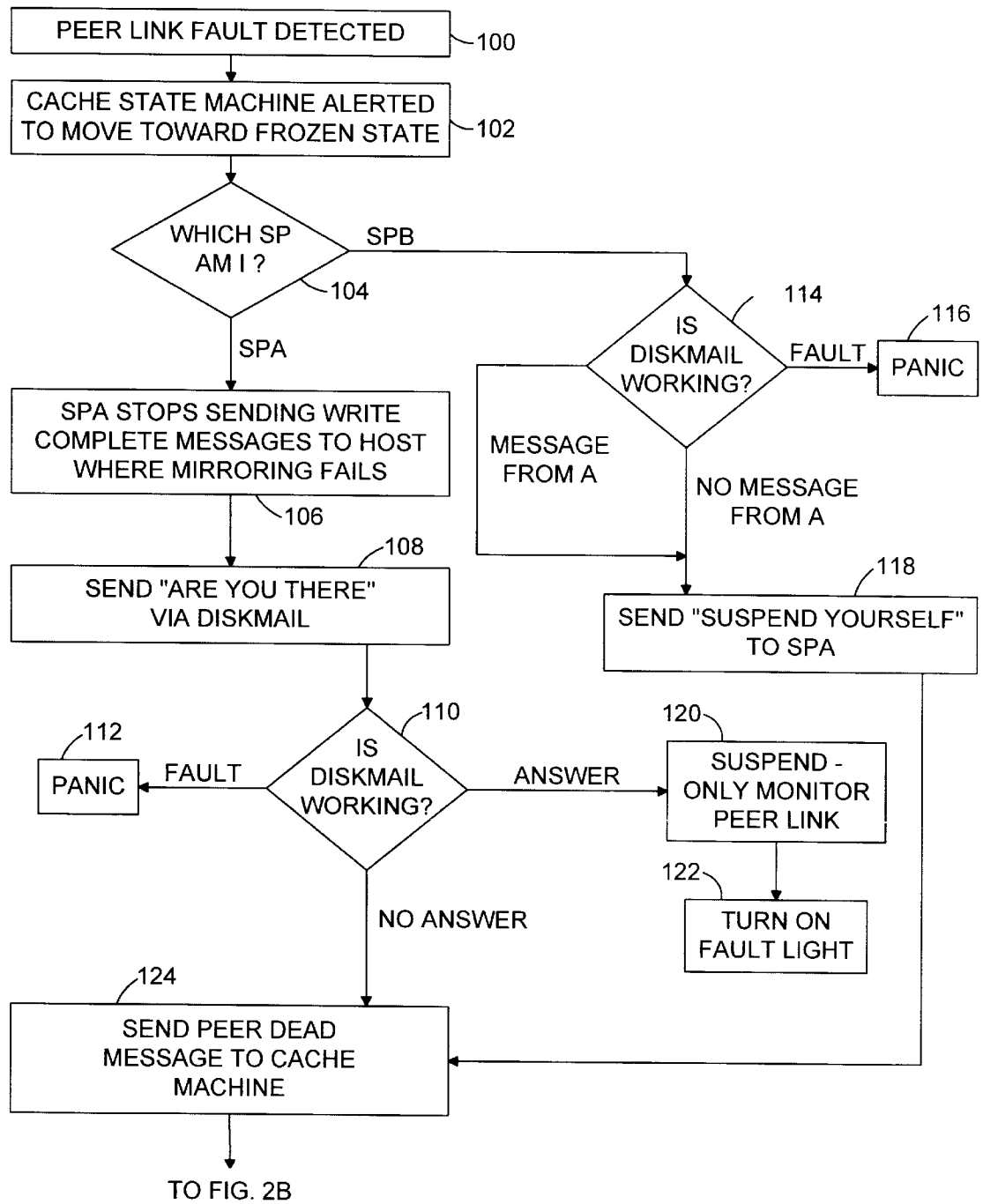
FIG. 2 is a flow chart of a fault isolation method of an embodiment of the present invention.
Figure 2B:
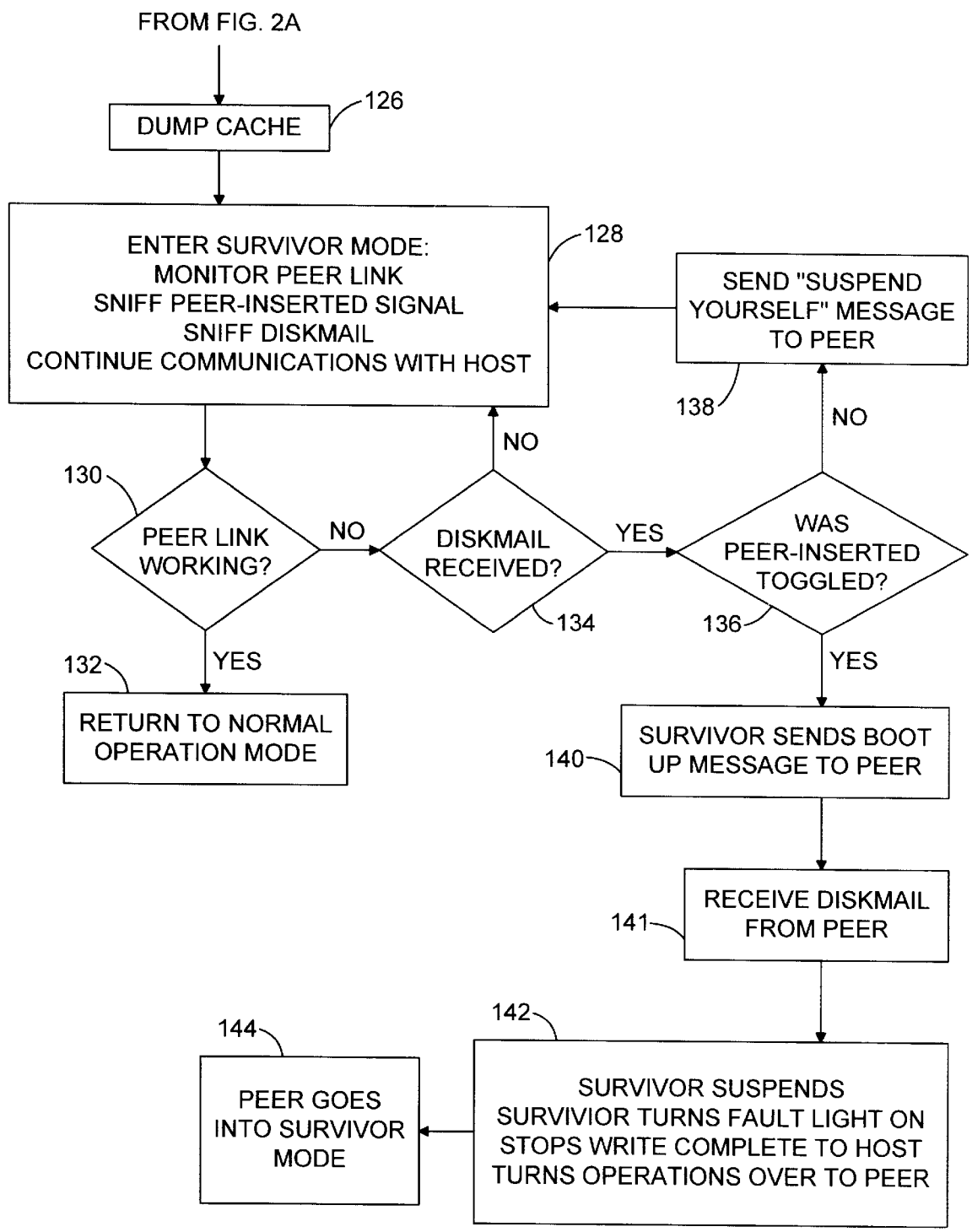

Referring now to FIG. 2, an algorithm performed by the storage processors when the peer-to-peer communication link fails is described. The method is initiated when a peer link fault is detected 100. For example, when storage processor A sends a message over the peer-to-peer communication link 20 and it fails to receive an expected response from storage processor B in a given time period and after a given number of tries, a fault has been detected and the algorithm initiates. Operations dependent upon the peer-to-peer communication link are notified of the failure. In a preferred embodiment, the cache state machine for the write cache is alerted to move toward a frozen state 102 in anticipation of a cache dump. The operation followed will be similar to other faults which prevent caching.

It is arbitrarily predetermined which of the storage processors will be suspended so that it may be removed and replaced to determine which of the processor boards is responsible for the failure of the peer-to-peer communication link. For the purposes of the present application, we assume that it will be storage processor A which gets suspended any time a peer link failure is first detected. Thus, the following steps depend on which SP (storage processor) slot a processor is in. The SP determines 104 which SP it is. Storage processor A stops sending write complete messages to the host for any writes which fail to get mirrored 106. A diskmail manager is used to determine if diskmail is working. Storage processor A sends an "Are you there?" type message 108 to storage processor B by writing the message to the appropriate mailbox in at least one of the disk drives in the disk array. Diskmail is the process by which messages from one processor are left in mailboxes in a disk drive. In a preferred embodiment, three redundant mailboxes are used, each in a different disk drive. Messages are written to all three mailboxes. Each of the three disk drives has two mailboxes, one for each storage processor. The storage processors periodically sniff the mailboxes to pick up any diskmail messages from their peer processor. The next action depends on the status of diskmail operation 110. If diskmail faults, the cache manager will panic 112 its storage processor. A fault occurs when the diskmail manager is unable to read or unable to write to the disk drive(s). Since the storage processor can't write to disk anyway, a cache dump is moot. Panic 112 means the storage processor is halted and memory may be saved to serve diagnostic purposes.

Meanwhile, storage processor B also monitors the operation of diskmail 114. If B's diskmail manager is unable to read or unable to write to the disk drive, storage processor B will panic 116, thereby shutting down. With diskmail working, however, storage processor B sends a "suspend yourself" message to storage processor A 118. Storage processor A has been preselected as the one which will be suspended first when trying to identify which processor is the cause of a peer-to-peer communication link failure. When storage processor A receives the "suspend yourself" message, it follows the instruction. Storage processor A enters a suspended state 120 in which it monitors communications over the dedicated peer-to-peer communication link 20. In a preferred embodiment, it does nothing else. In any case, suspension of full operation requires termination of write operations to disk drives. Preferably, all substantive communications with disk drives and host computers terminate. The arbitrarily preselected storage processor A turns on its fault light 122. A user or technician addressing the problem will thus be alerted to trying to substitute a new processor board for the one in slot A.

Referring back to storage processor A looking for the diskmail message 110, if the diskmail can be read but there is no response from the processor B after waiting a reasonable time, it is presumed that the storage processor B is dead. In this case, storage processor A will follow the steps for becoming the surviving processor. On the other hand, with both processors A and B running in normal operation, the preselected processor A will be suspended and processor B will become the surviving processor. The surviving processor begins by sending a peer dead message to the cache machine to proceed on that basis 124. Thus, the cache machine proceeds with dumping the cache 126. The surviving storage processor will then continue running in survivor mode 128.

In the survivor mode 128, a storage processor will monitor operation of the peer-to-peer communication link 20. The survivor will also sniff a signal indicative of when a peer processor gets inserted into the chassis. Thus, at least once per second, the surviving processor will sniff the peer-inserted signal. This signal is toggled when a board is removed or inserted into its slot. The peer-inserted signal for each processor board is preferably carried on a backplane trace available to both processors. The survivor will also sniff the disk mailbox locations for detecting any communications from the peer processor. The survivor will also continue to communicate with the host computer.

In the survivor mode, the processor will passively monitor the peer-to-peer communication link 130. If it is working, operation can return to normal 132. If it is not working and no diskmail has been received from the other processor, survivor mode continues 134. If a diskmail is received from the other processor 134, the survivor checks to determine if the peer-inserted signal has been toggled 136. If not, that should mean that a new processor has not been inserted, so the survivor sends a suspend yourself message to the peer processor 138 and survivor mode continues. This handles the case where the suspended processor begins powering itself up for some aberrant reason. If the survivor detects that a new processor has been inserted, the survivor sends a boot up message to the peer 140. This is in preparation for now getting itself replaced, to determine if it is the problem on the peer-to-peer communication link. Upon learning through diskmail that the peer has booted up 141, the survivor suspends itself and illuminates its fault light 142. The survivor stops issuing write completes to the host and passes operation over to the peer processor 142. The peer now enters the survivor mode 144. The user or technician can now try replacing the processor with its fault light on. Most often replacement of one or the other processor will cure the peer-to-peer communication link. If not, the technician will need to investigate further.

Figure 3:
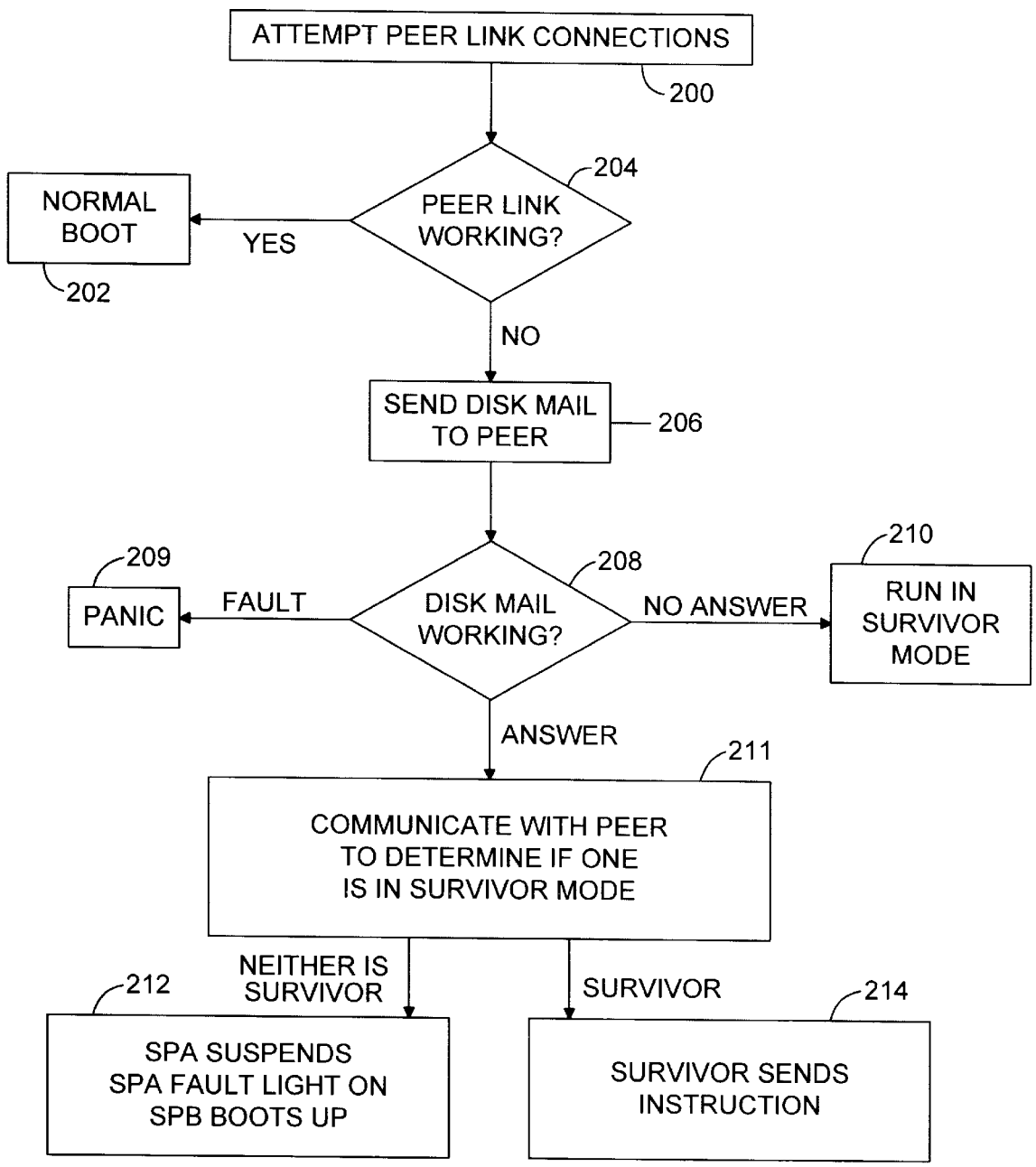
FIG. 3 is a flow chart of a power-up program of an embodiment of the present invention.

Now we consider the case of a processor inserted into the chassis and beginning power up. The processor does not know whether or not there was any problem with the peer-to-peer communication link. Referring to FIG. 3, during power up, one of the first operations is to attempt a connection over the peer-to-peer communication link 200. If the peer-to-peer communication link works 204, then the processor can proceed with a normal boot 202. If the other processor is a survivor of a peer-to-peer communication link failure, it will also return to normal operation once it realizes the peer-to-peer communication link is working. In power up, if the peer-to-peer communication link does not work 204, the powering up processor sends a diskmail message to the peer processor 206. If the diskmail message faults 208, the processor panics 209. If there is no response after allowing an appropriate delay for the peer to power up 208, it is assumed that the peer is dead and the processor proceeds in survivor mode 210. If an answer is received through the diskmail 208, then communications with the peer are conducted so as to determine if one is in survivor mode 211. In a preferred embodiment, when a processor powers up, it sends an "I am initializing" message over diskmail to the peer processor. If both processors receive this message, then neither one is a survivor and the arbitrarily preselected routine is entered in which the storage processor A is suspended and its fault light illuminated while storage processor B boots up and becomes the survivor 212. If there is a survivor processor, the survivor sends an instruction 214 to its peer as set forth in the survivor mode algorithm of FIG. 2. If the survivor detects that this is a power up of a newly replaced processor, then it will suspend itself and turn control over to the new processor 142. If the survivor detects that the processor is the same processor that was supposed to be already suspended, it will instruct it to suspend itself again so that it can replaced by the technician 138.

By providing each of the dual processors with the fault detection algorithms described herein, the technician is easily guided by the fault indicators through the task of locating the problem. Advantageously, one of the processors remains operational during the entire replacement process in which the technician searches for the faulty board.

In alternative embodiments, the disclosed program code may be implemented as a computer program product for use with a data storage computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), pre-loaded with a computer system (e.g., on system ROM or fixed disk), or distributed from a server or electronic bulletin board over the network (e.g., the Internet or World Wide Web).

Although the embodiments hereinbefore described are preferred, many modifications and refinements which do not depart from the spirit and scope of the invention may be contemplated by those skilled in the art. It is intended that all such modifications, including but not limited to those set forth above, be covered by the following claims.

We claim:

1. A fault isolation method for use in a disk array storage system having a first and a second storage processor redundantly connected to an array of disk drives and having a peer-to-peer communication link connecting the first and second storage processors, said method comprising:

detecting an inability to communicate over the peer-to-peer communication link upon failing to receive a response over the peer-to-peer communication link and receiving a response on a disk drive after leaving a message in at least one of said disk drives;

suspending full operation of preselected first storage processor while continuing operation of the second storage processor; and indicating a fault with the first storage processor.

2. The fault isolation method of claim 1 further comprising, upon suspending full operation of the preselected first storage processor, putting the second storage processor in a survivor mode.

3. A fault isolation method for use in a disk array storage system having a first and a second storage processor redundantly connected to an array of disk drives and having a peer-to-peer communication link connecting the first and second storage processors, said method comprising:

detecting an inability to communicate over the peer-to-peer communication link;

suspending full operation of preselected first storage processor while continuing operation of the second storage processor and putting the second storage processor in a survivor mode;

indicating a fault with the first storage processor;

detecting at the second storage processor replacement of the first storage processor;

testing the peer-to-peer communication link; and if still unable to communicate over the peer-to-peer communication link, instructing the replaced first storage processor to boot up and suspending full operation of the second storage processor.

4. The fault isolation method of claim 3 wherein said step of detecting an inability to communicate comprises failing to receive a response over the peer-to-peer communication link and receiving a response on a disk drive after leaving a message in at least one of said disk drives.

5. The fault isolation method of claim 3 further comprising determining that the storage processors are still unable to communicate over the peer-to-peer communication link upon receiving a response on a disk drive after leaving a message in at least one of said disk drives when concurrently communication over the peer-to-peer communication link is not possible.

6. The fault isolation method of claim 3 wherein said step of suspending comprises terminating communications with the array of disk drives and a host computer yet continuing to monitor the peer-to-peer communication link.

7. The fault isolation method of claim 3 wherein said step of indicating a fault comprises illuminating a light.

8. The fault isolation method of claim 3 wherein the survivor mode comprises monitoring the peer-to-peer communication link, monitoring replacement of the first storage processor, monitoring for peer processor communications through the disk drives and communicating with a host computer.

9. The fault isolation method of claim 8 further comprising sending an instruction to the first storage processor to suspend in response to receiving a peer processor communication through a disk drive and failing to detect replacement of the first storage processor.

10. The fault isolation method of claim 3 further comprising upon suspending full operation of the second storage processor indicating a fault with the second storage processor.

11. A computer program product including a computer program on a computer readable medium for use in power up of a storage processor of a disk array storage system having first and second peer storage processors redundantly connected to an array of disk drives and having a peer-to-peer communication link connecting the first and second storage processors, said computer program comprising:

program code for attempting to communicate over the peer-to-peer communication link;

program code for communicating with the peer storage processor through leaving a message in at least one of said disk drives;

program code for suspending preselected first peer storage processor upon determination that there is a failure to communicate over the peer-to-peer communication link and neither peer storage processor is a survivor of a previous peer-to-peer communication link failure; and program code for following instruction from a survivor of a previous peer-to-peer communication link failure.

12. The computer program product of claim 11 wherein said program code for suspending further comprises program code for illuminating a fault light associated with the first peer storage processor. processor, for suspending itself.

13. A computer program product including a computer program on a computer readable medium for use in power up of a storage processor of a disk array storage system having first and second peer storage processors redundantly connected to an array of disk drives and having a peer-to-peer communication link connecting the first and second storage processors, said computer program comprising:

program code for attempting to communicate over the peer-to-peer communication link;

program code for communicating with the peer storage processor through leaving a message in at least one of said disk drives;

program code for suspending preselected first peer storage processor when there is a failure to communicate over the peer-to-peer communication link and neither peer storage processor is a survivor of a previous peer-to-peer communication link failure;

program code for following instruction from a survivor of a previous peer-to-peer communication link failure; and program code for booting up into a survivor mode if no response is received through leaving a message in at least one of said disk drives wherein the survivor mode comprises monitoring the peer-to-peer communication link, monitoring for peer processor communications through the disk drives and communicating with a host computer.

14. A computer program product for use after a peer-to-peer communication link failure in a disk array storage system having first and second peer storage processors redundantly connected to an array of disk drives and having the peer-to-peer communication link connected between the first and second storage processors, said computer program product including a computer program on a computer readable medium for use by a surviving one of the first and second storage processors, the computer program comprising:

program code for monitoring communications over the peer-to-peer communication link;

program code for monitoring at least one of the disk drives for communications between the first and second peer storage processors;

program code for detecting replacement of the peer storage processor; and program code, responsive to an inability to communicate over the peer-to-peer communication link and communications through leaving messages in at least one of the disk drives, for instructing its peer storage processor through leaving a message in at least one of said disk drives to boot up and, after learning of the boot up of the peer storage processor, for suspending itself.

15. The computer program product of claim 14 further comprising program code for instructing its peer through leaving a message in at least one of said disk drives to suspend operation when there is a failure to communicate over the peer-to-peer communication link and replacement of the peer storage processor has not been detected.

16. The computer program product of claim 14 further comprising program code for changing from survivor mode to normal operation when the peer-to-peer communication link becomes operable.

17. A data storage system comprising:

a first storage processor;

a second storage processor;

a peer-to-peer communication link connecting said first storage processor to said second storage processor;

a first communication channel connecting said first storage processor to a plurality of disk drives;

a second communication channel connecting the second storage processor to the plurality of disk drives;

program code in each of said first and second storage processors for a survivor of a previous peer-to-peer communication link failure to detect replacement of the peer storage processor; and messaging program code in each of said first and second storage processors for communicating through leaving messages in at least one of the disk drives when said peer-to-peer communication link is inoperable.

18. The data storage system of claim 17 further comprising a failure indicator for each of the storage processors which is activated when its respective storage processor is suspended.

19. The data storage system of claim 17 further comprising program code in each of said first and second storage processors for suspending said first storage processor when there is an inability to communicate over the peer-to-peer communication link and both storage processors are running in normal operation mode.

20. The data storage system of claim 19 wherein suspending comprises terminating communications with the plurality of disk drives yet continuing to monitor the peer-to-peer communication link.

21. The data storage system of claim 17 further comprising program code in each of said first and second storage processors for the survivor to monitor said peer-to-peer communication link and if still unable to communicate over said peer-to-peer communication link after replacement of the peer storage processor, instructing the peer storage processor through said messaging program code by leaving a message in at least one of the disk drives to boot up and, after learning of the boot up of the peer storage processor, suspending itself.

22. The data storage system of claim 17 further comprising program code in each of said first and second storage processors for the survivor to monitor said peer-to-peer communication link and if still unable to communicate over said peer-to-peer communication link instructing its peer storage processor through said messaging program code leaving a message in at least one of the disk drives to suspend operation when replacement of the peer storage processor has not been detected.

* * * * *

UNITED STATES PATENT AND TRADEMARK OFFICE
CERTIFICATE OF CORRECTION

PATENT NO. : 6,574,753 B1  Page 1 of 1
DATED : June 3, 2003
INVENTOR(S) : Michael D. Haynes and Charles H. Hopkins It is certified that error appears in the above-identified patent and that said Letters Patent is hereby corrected as shown below:

<u>Column 7,</u>
Line 62, delete "processor, for suspending itself."

Signed and Sealed this

Sixteenth Day of September, 2003

JAMES E. ROGAN
*Director of the United States Patent and Trademark Office*